(12) United States Patent
Courtemanche (10) Patent No.: US 6,406,655 B1
(45) Date of Patent: Jun. 18, 2002

(54) METHOD OF MAKING A MOLDED TRACK FOR USE WITH A SNOWMOBILE

(75) Inventor: Denis Courtemanche, Sherbrooke (CA)

(73) Assignee: Camoplasy Inc., Quebec (CA)

( * ) Notice: Subject to any disclaimer, the term of this patent is extended or adjusted under 35 U.S.C. 154(b) by 0 days.

(21) Appl. No.: 09/480,152

(22) Filed: Jan. 10, 2000

(51) Int. Cl.[7] .............................................. B29C 43/18
(52) U.S. Cl. ........................ 264/257; 264/258; 264/277; 264/324; 156/137; 425/34.2
(58) Field of Search ................................. 264/257, 258, 264/259, 324, 325, 326, 263, 271.1, 275.1, 277; 425/34.2, 395; 156/137

(56) References Cited

U.S. PATENT DOCUMENTS

| | | | | |
|---|---|---|---|---|
| 3,712,689 A | * | 1/1973 | Chaumont | 305/166 |
| 3,722,963 A | * | 3/1973 | Cetrulo, Jr. | 305/168 |
| 3,754,798 A | * | 8/1973 | Chaumont | 305/166 |
| 3,887,243 A | | 6/1975 | Chaumont | 305/24 |
| 3,900,231 A | * | 8/1975 | Ohm | 305/178 |
| 4,023,865 A | | 5/1977 | Morissette | 305/35 |
| 4,217,006 A | | 8/1980 | Dehnert | 305/35 |
| 4,474,414 A | | 10/1984 | Tokue | 305/35 |
| 4,991,911 A | | 2/1991 | Blais | 305/24 |
| 5,174,638 A | * | 12/1992 | Tokue et al. | 305/166 |
| 5,722,745 A | * | 3/1998 | Courtemanche et al. | 305/168 |
| 5,730,510 A | * | 3/1998 | Courtemanche | 305/168 |
| 5,755,495 A | | 5/1998 | Cook | 305/122 |
| 5,814,167 A | | 9/1998 | Beaudoin | 148/639 |
| 6,086,811 A | * | 7/2000 | Fike | 264/271.1 |
| 6,109,705 A | * | 8/2000 | Courtemanche | 305/178 |
| 6,284,180 B1 | * | 9/2001 | Feldmann | 264/254 |

FOREIGN PATENT DOCUMENTS

CA          2196355          1/1997

* cited by examiner

Primary Examiner—Jan H. Silbaugh
Assistant Examiner—Stefan Staicovici
(74) Attorney, Agent, or Firm—Nixon & Vanderhye PC

(57) ABSTRACT

A method of making a molded track for use with a snowmobile having a suspension system equipped with slide rails consists of a series of steps that include preparing a mold press having a stationary inner mold and a movable outer mold with the inner mold displaying one or more rows of peripherally spaced recesses having a given shape, inserting in the recesses a series of slide bearing elements each having a generally flat portion having a shape corresponding to the shape of the recesses, laying one or more layers of rubber and fabrics on the inner mold and vulcanizing the rubber to form a molded track whereby the slide bearing elements are integrally formed with the molded track with one face of the flat portion of the elements being exposed so that it is frictionally contacted by a slide rail during use of the snowmobile.

15 Claims, 7 Drawing Sheets

METHOD OF MAKING A MOLDED TRACK FOR USE WITH A SNOWMOBILE

FIELD OF THE INVENTION

The present invention relates to method of making a molded track for use with a snowmobile which is equipped with a suspension system having slide rails bearing on the inner face of the lower run of the track.

BACKGROUND OF THE INVENTION

Snowmobile tracks are usually provided with a series of sheet metal clips located at spaced intervals in transversely separated longitudinal rows (usually two) of openings and so positioned as to engage, in slide bearing contact, the underside of slide rails forming part of the snowmobile suspension system. In most cases, these clips include a pair of spaced wings that are fixed to the belt by forcingly wrapping them around the rubber material in which is embedded a transverse reinforcing rod; an example of such track is illustrated in applicant's Canadian patent no. 2,182,845 issued Mar. 30, 1999. These clips may or may not be located at each opening of the track; in other words, these metal clips may be present adjacent each opening while, in other cases, they may be provided at every third or fourth opening (an example of such track is described in applicant's U.S. Pat. No. 5,722, 745 issued Mar. 3, 1998). In some tracks, the guide clips are provided with upwardly projecting lug portions which are adapted to contact the side of the slide rails and prevent the track guide clips from moving laterally.

An example of such track for use in a snowmobile may be found described in U.S. Pat. No. 5,174,638 issued Dec. 29, 1992 to Tokue et al. Such tracks, as well as all other tracks, are manufactured through a series of known assembling steps and, once assembled, the rubber is vulcanized and cured to form a molded track. Therefore, each track is removed from its mold press and conveyed to a separate station where clips are individually clamped at predetermined locations along the track.

It is evident that this last separate step is an additional time consuming and costly operation as it requires special training and manpower.

OBJECTS AND STATEMENT OF THE INVENTION

It is an object of the present invention to obviate to the above problem associated with the presently method of manufacturing a snowmobile track by integrating these clips as a step prior to the presently known assembling steps of the various components forming the track and prior to the vulcanizing and curing steps.

Therefore, the present invention relates to a method of making a track for a snowmobile of the type having a suspension system equipped with slide rails, which comprises:

preparing a mold press consisting of a stationary inner mold and a movable outer mold; the inner part having one or more rows of peripherally spaced recesses having a predetermined shape;

inserting, in the recesses, a series of slide bearing elements; each element including a first generally flat portion having opposite inner and outer faces and having a shape corresponding to the shape of the recesses so that the elements may be inserted therein;

laying one or more layers of rubber and fabrics on the inner mold; and vulcanizing the rubber to form a molded track whereby the elements are integrally formed with the molded track with the outer face of the flat portion of each element being exposed so that it is frictionally contacted by the slide rail during use of the snowmobile.

The present invention may be adapted to various constructions of snowmobile tracks including those which do not have openings (the track is driven by drive sprockets engaging lugs integrally formed to the inner surface of the track), tracks which require clips at a given number of opening intervals as well as tracks which require clips at every opening of the track.

Furthermore, this method applies also to tracks which are equipped with or without transverse reinforcing rods embedded in the rubber material of the tracks.

In one form of the invention, the recesses of the inner mold are equipped with magnets so as to hold these elements as they are mounted to the inner mold.

The present invention therefore avoids the presently known clipping step after the vulcanized track is cured.

In the present application, the word "clip" has been replaced by slide bearing elements. Indeed, once the formed track is removed from the mold press, there is no clipping procedure performed as the metallic elements are already integral with the track.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
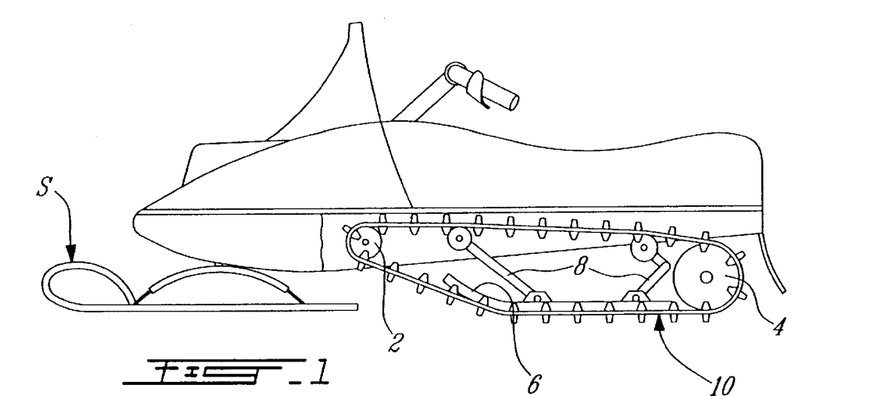
FIG. 1 is a side elevational view of a snowmobile incorporating the track structure of the present invention.

Referring to FIG. 1, there is shown a snowmobile, the underside of which comprises a ski S for steering and an endless track 10 for traction. The track is mounted about a driving sprocket 2 and an idler sprocket 4. The lower run of the track is maintained on the ground by means of a suspension system consisting of a pair of longitudinal slides 6 connected to one end of a pair of arms, the other end fixedly mounted to the snowmobile body.

Figure 2:
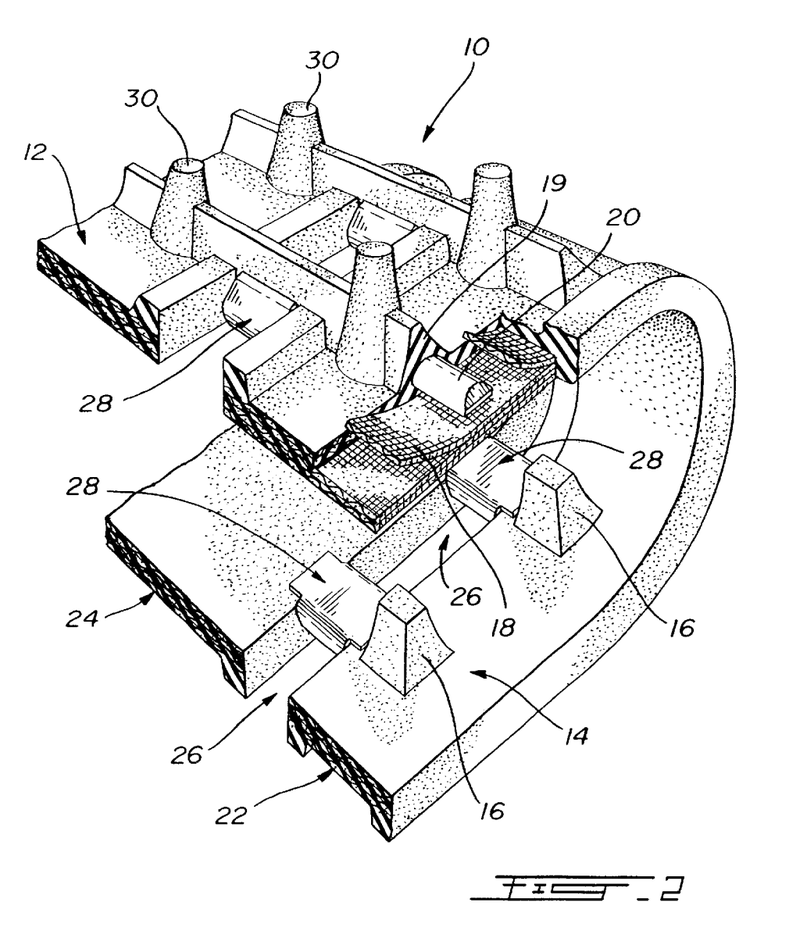
FIG. 2 is a partly cut away perspective view of a snowmobile track made in accordance with the present invention.

Referring to FIG. 2, the snowmobile track 10 comprises an outer surface 12 and an inner surface 14, the latter being provided with integrally formed lugs 16 which are drivingly engaged by the driven sprocket of the snowmobile.

The track is made of rubber as its principal component but may include a plurality of layers of reinforcing woven fabrics 18. The track is also reinforced by means of a plurality of rods 20 extending transversely of the track and embedded in the rubber material. In most cases, the track includes a pair of opposite lateral sections 22 (only one being shown) and an intermediate central portion 24, the sections being separated from one another by means of rows of openings or apertures 26 which are defined by means of interconnecting sections of rubber material on which are provided a series of slide bearing elements 28 which serve principally to receive the lower face of the slide rails 6 forming part of the suspension system of a snowmobile.

The outer surface 12 of the track is formed with a series of integral profiles 30 having various configurations to provide traction to the snowmobile.

In those snowmobile tracks that do not have lugs 16, the driving of the track is achieved by means of sprockets having peripheral lugs that are received in the apertures 26 to engage the elements 28. In some tracks where lugs 16 are provided, there may not be any need for apertures 26. Hence, with rubber and woven fabrics filling the gaps between the sections 22 and 24, the track consists of a single layer of rubber and woven fabrics.

Figure 3:
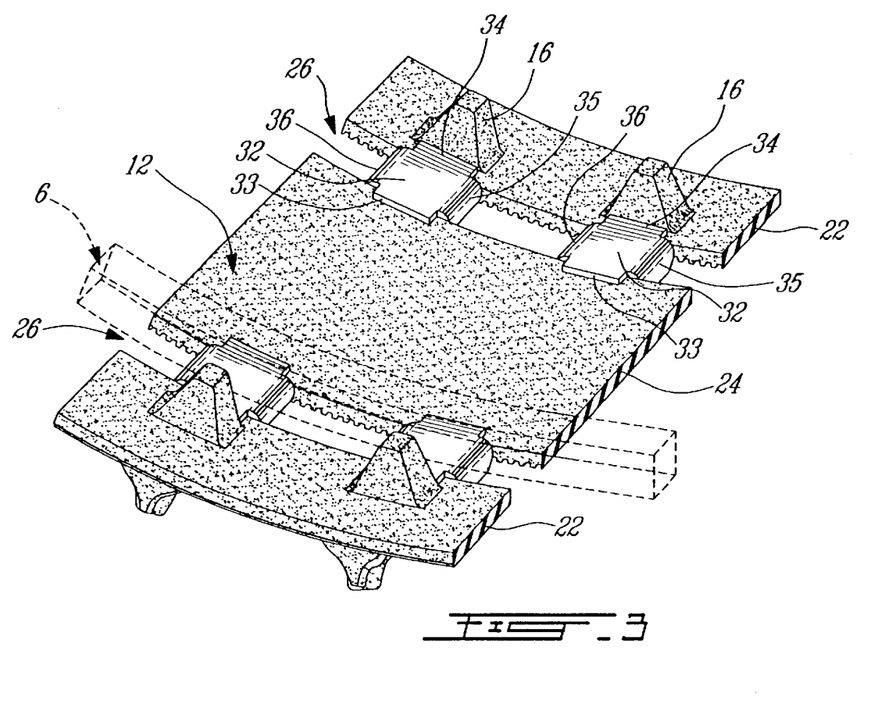
FIG. 3 is a partial cut away perspective view showing the inner surface of the snowmobile track.
Figure 4:
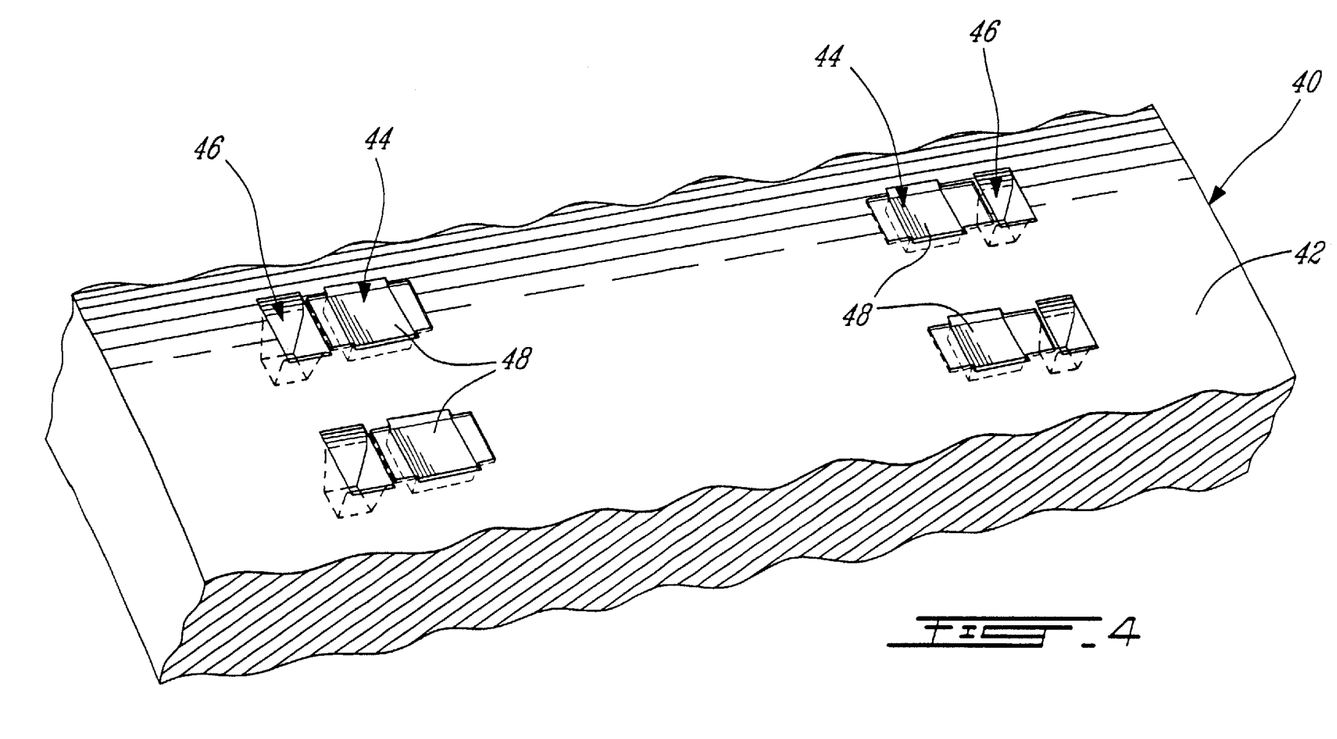
FIG. 4 is a partial cut away perspective view showing part of the inner mold of a press for making a snowmobile track.
Figure 5:
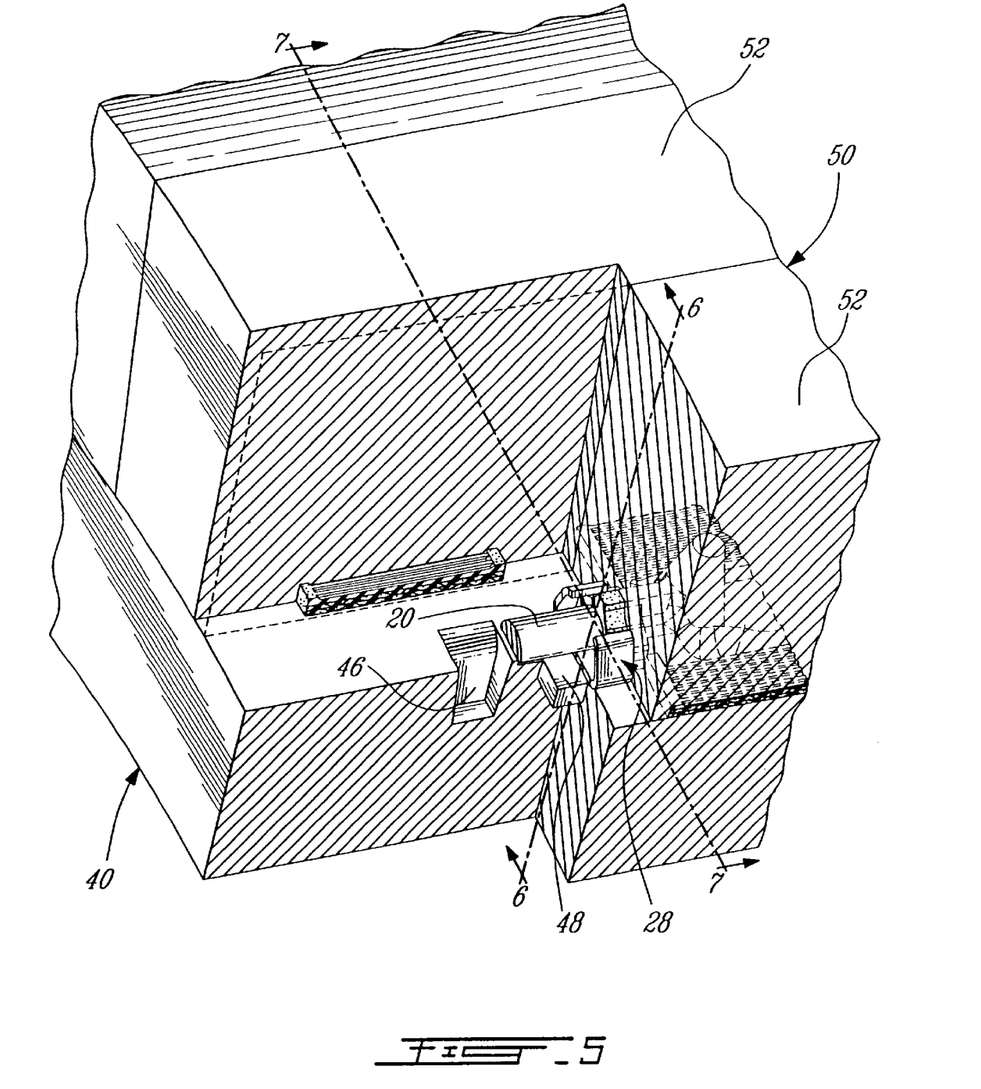
FIG. 5 is a cut away perspective view through the inner and outer press molds.
Figure 6:
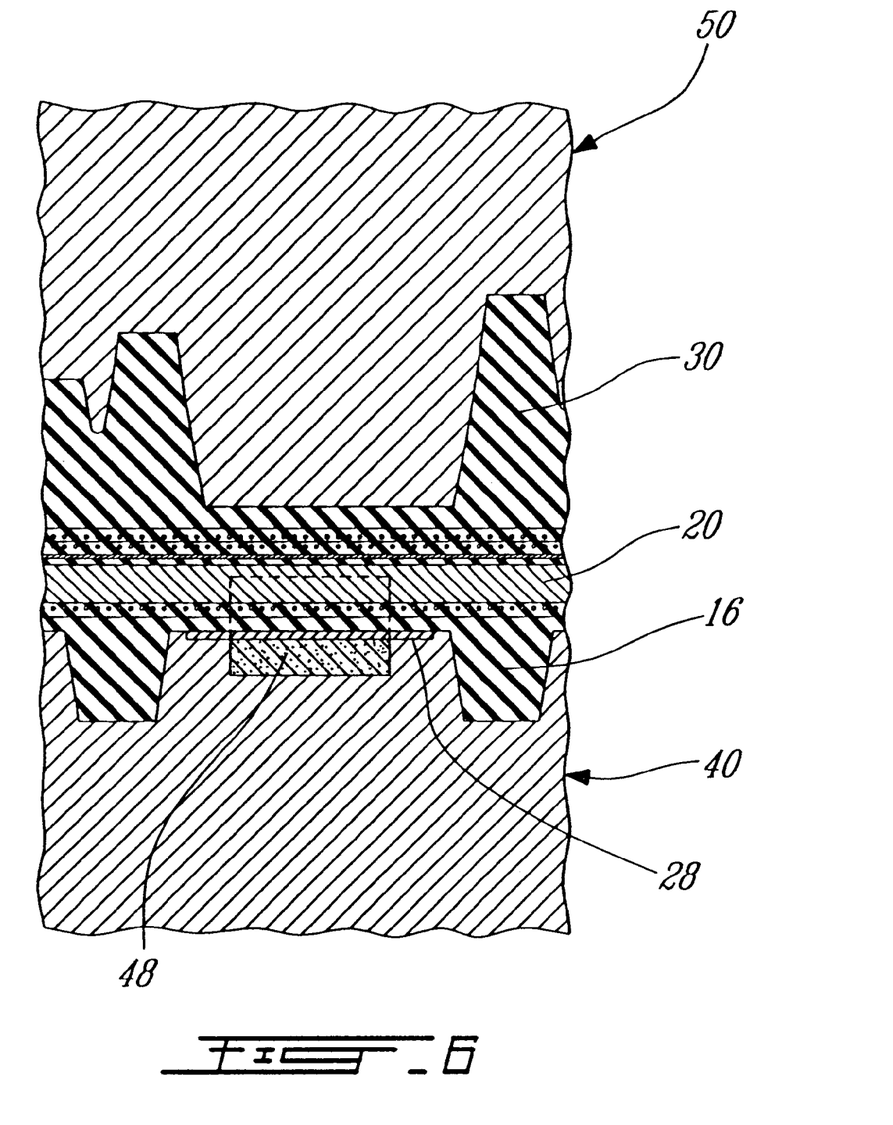
FIG. 6 is a cross-sectional view taken along lines 5—5 of FIG. 4.
Figure 7:
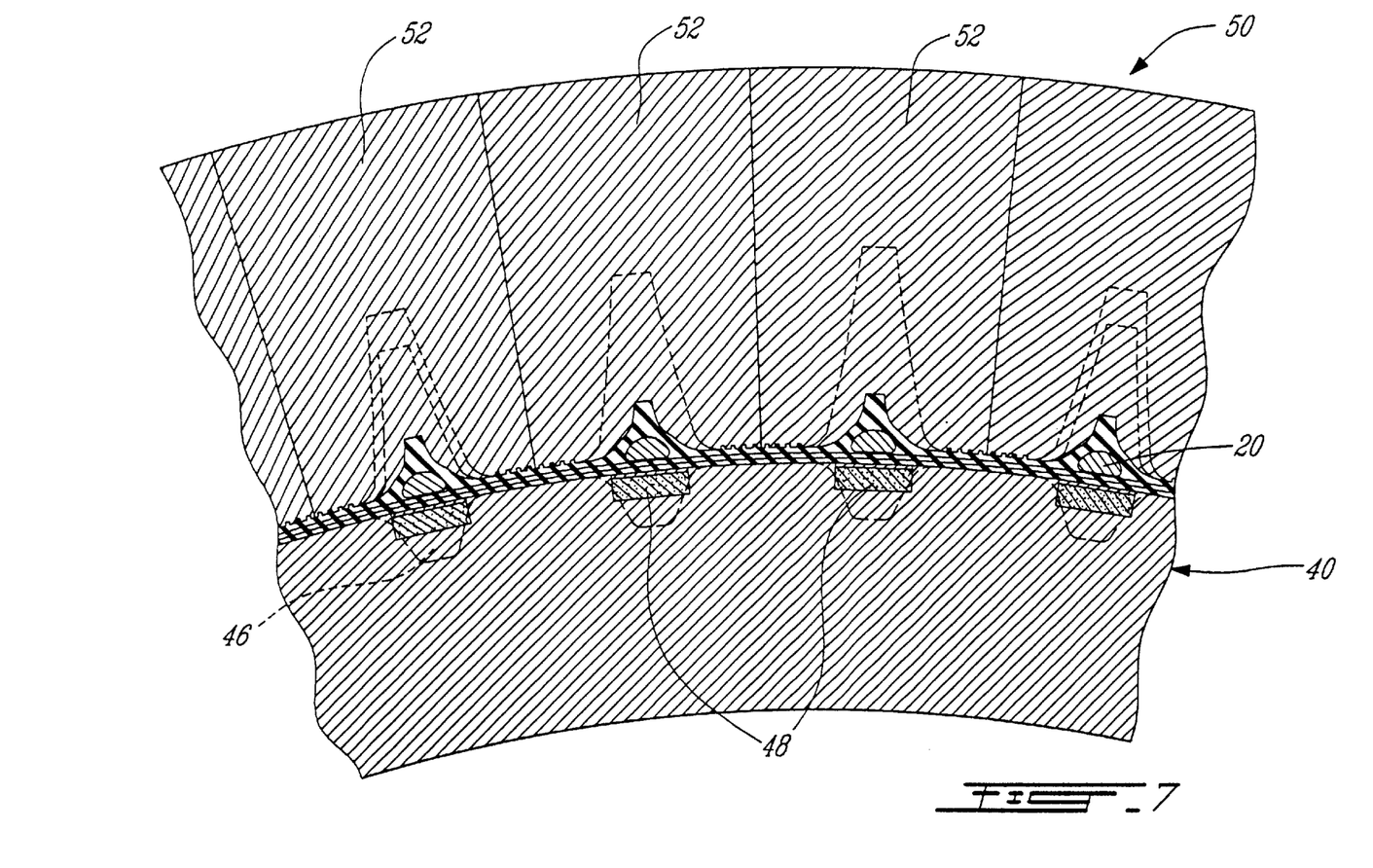
FIG. 7 is a cross-section taken along lines 6—6 of FIG. 4.
Figure 8:
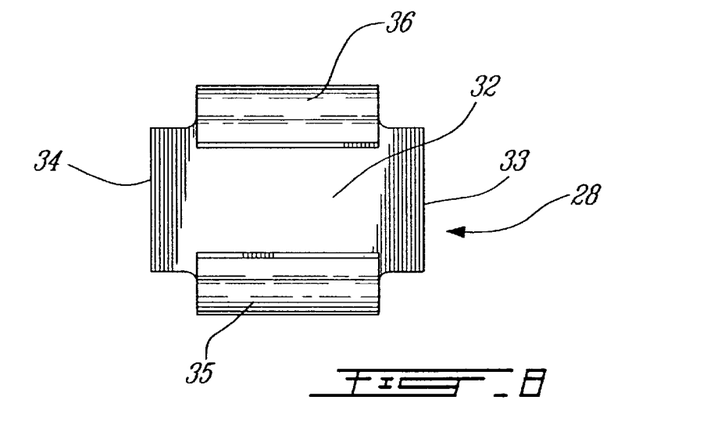
FIG. 8 is a top plan view of a metallic slide bearing element used in the snowmobile track.
Figure 9:
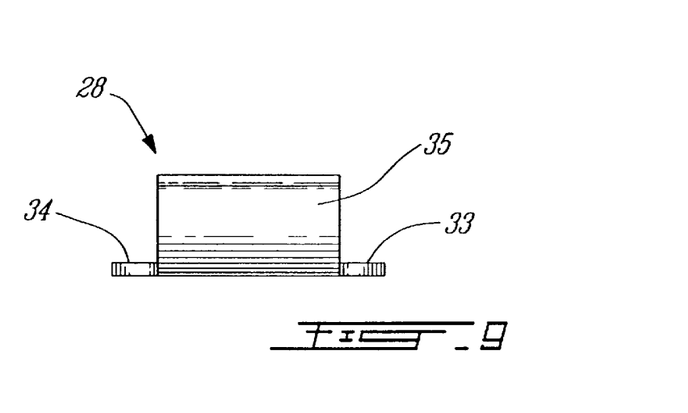
FIG. 9 is a side view thereof.
Figure 10:
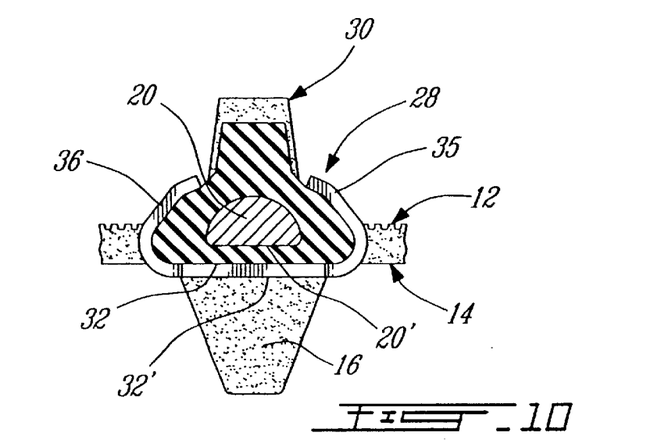
FIG. 10 is a cross-sectional view showing the metallic element integrally formed to the snowmobile track.

As can be seen in FIG. 3, the metallic elements 28 comprises a rectangular portion 32 which is generally flat with opposite tab positions 33 and 34 and two opposite wing portions 35 and 36. This element is also shown in FIGS. 8, 9 and 10.

The conventional way of making a snowmobile track is to place several layers of rubber and woven fabrics on the inner mold of a press, placing a series of transverse rods at peripheral intervals, laying additional layers of rubber of woven fabrics thereover and then vulcanizing the rubber so that the track is molded with the rods embedded in the rubber and fabric body. Once the rubber is cured, the outer mold of the mold is distanced radially away from the inner mold, the track is removed from the inner mold and brought to another station where clips are clamped at the predetermined locations along the track.

The present invention is concerned with avoiding this last step of clipping.

Therefore, the inner mold 40 of the press, which consists of a rotary drum, is modified as shown in FIGS. 4 to 7 (where a segment on the rotary drum is shown). As can be seen, this inner mold 40 has now a modified outer circumferential surface 42 displaying a series of recesses 44 adjacent recesses 46 which form the lugs 16 of the track. These recesses 44 have a shape corresponding substantially to the rectangular portion of the metallic elements 28. In order to securely hold a metallic element 28 (manually positioned in a recess 44), a magnet 48 in each recess to hold the metallic element 28 as the drum 44 is rotated by the operator during the successive steps of placing these elements peripherally on the drum.

Once all the metallic elements are in their respective recesses, layers of fabrics and rubber are placed thereover. Then, the reinforcing rods 20 are laid over the layers of fabrics and rubber, extending between the wing portions 35 and 36 of each metallic element, but slightly above the rectangular portion 32. Indeed, the bottom face 20' (see FIG. 10) does not contact the upper face of the rectangular portion 32 of the element since it is supported, outside the metallic elements, on layers of fabrics and rubber. Subsequently, additional layers of fabrics and rubber are laid over the rods as well as over the previously placed layers of fabrics and rubber. Then, the outer mold 50 of the press consisting of a series of peripheral segments 52 (see FIG. 5) is radially moved towards the inner mold with the track components laid thereon. Except for the presence of recesses 44, the construction of such mold press is well known in the art and will not be described in detail; means are provided for vulcanizing the rubber material once the radially moved segments have moved in contact with the track components on the inner mold. The vulcanizing process results in the making of an integral body of all the components. Hence, the metallic elements are securely held to the molded track due to the presence of rubber material that flows in the area between the wing portions of the element and around the reinforcing rods 20. Therefore, the wing portions 35 and 36 no longer have a clip or cramping function but only act as rubber retaining members.

As can be seen, in FIG. 10, the under surface 32' of the metallic element extends slightly below the plane of the inner surface 14 of the track so that the sliding rails of the suspension system of the snowmobile will only contact the metallic elements during use, not the rubber material.

Although the invention has been described above with respect to one specific form, it will be evident to a person skilled in the art that it may be modified and refined in various ways. Evidently, depending on the type of snowmobile tracks i.e. without openings, clips at every third aperture, for example, etc. the configuration of the inner mold of the press will vary as far as the recesses are concerned. It is therefore wished to have it understood that the present invention should not be limited in scope, except by the terms of the following claims.

What is claimed is:

1. A method of making a molded track for use with a snowmobile comprising:

positioning, in peripherally spaced recesses of a stationary inner mold, a series of metallic elements having a base and opposite bent wings;

placing a first layer of rubber on said inner mold in areas other than where said wings are present;

placing on said first layer of rubber a first layer of fabrics;

placing a reinforcing rod transversely of said first layers of rubber and fabrics and between said wings of said elements;

placing a second layer of fabrics over said first layer of fabrics and over said rods;

placing a second layer of rubber over said second layer of fabrics to form an assembly of track components; and pressing a movable outer mold onto said assembly and vulcanizing said rubber such that vulcanized rubber will flow about said rods and between said wings to integrally form said elements and said rods to said molded track.

2. A method as defined in claim 1, wherein said inner mold is a rotary drum and wherein said movable outer mold consists of a series of radially movable arc-shaped mold sections peripherally disposed around said rotary drum.

3. A method of making a molded track for use with a snowmobile comprising:

positioning, in peripherally spaced recesses of a stationary inner mold, a series of metallic elements having a base and opposite bent wings;

placing a first layer of rubber on said inner mold in areas other than where said wings are present;

placing on said first layer of rubber a first layer of fabrics;

placing a second layer of fabrics over said first layer of fabrics;

placing a second layer of rubber over said second layer of fabrics to form an assembly of track components; and pressing a movable outer mold onto said assembly and vulcanizing said rubber such that vulcanized rubber will flow between said wings to integrally form said elements to said molded track.

4. A method as defined in claim 3, further comprising:

placing a series of reinforcing rods transversely on said first layers of rubber and fabrics.

5. A method as defined in claim 4, wherein said step of rod placing consists of laying a rod transversely at each positioning of said metallic elements.

6. A method as defined in claim 1, wherein said metallic elements are fixedly held in said recesses.

7. A method as defined in claim 2, wherein said metallic elements are fixedly held in said recesses.

8. A method as defined in claim 3, wherein said metallic elements are fixedly held in said recesses.

9. A method as defined in claim 4, wherein said metallic elements are fixedly held in said recesses.

10. A method as defined in claim 5, wherein said metallic elements are fixedly held in said recesses.

11. A method as defined in claim 6, wherein said metallic elements are held in said recesses by magnets located in said recesses.

12. A method as defined in claim 7, wherein said metallic elements are held in said recesses by magnets located in said recesses.

13. A method as defined in claim 8, wherein said metallic elements are held in said recesses by magnets located in said recesses.

14. A method as defined in claim 9, wherein said metallic elements are held in said recesses by magnets located in said recesses.

15. A method as defined in claim 10, wherein said metallic elements are held in said recesses by magnets located in said recesses.

* * * * *